UNITED STATES PATENT OFFICE.

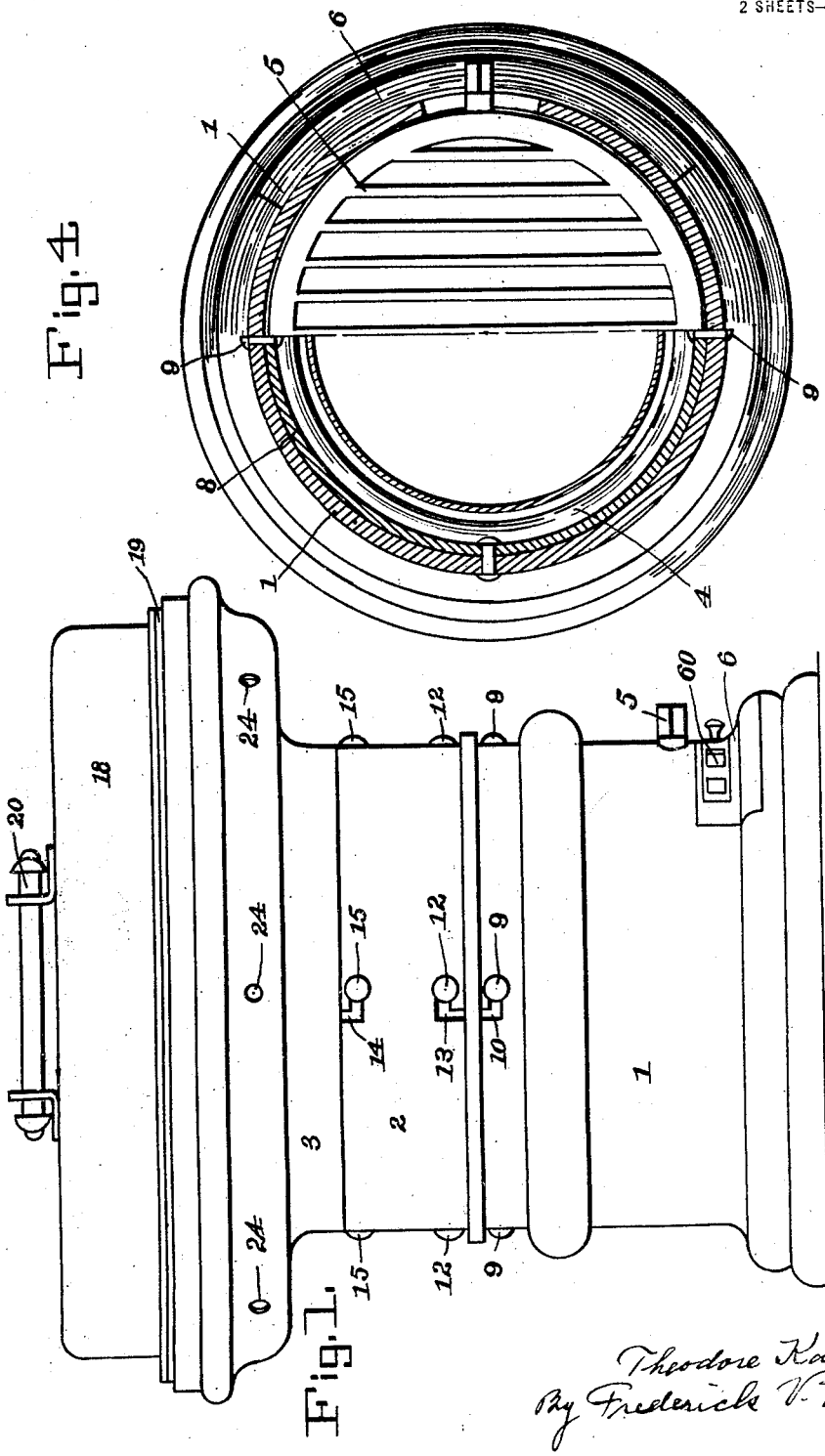

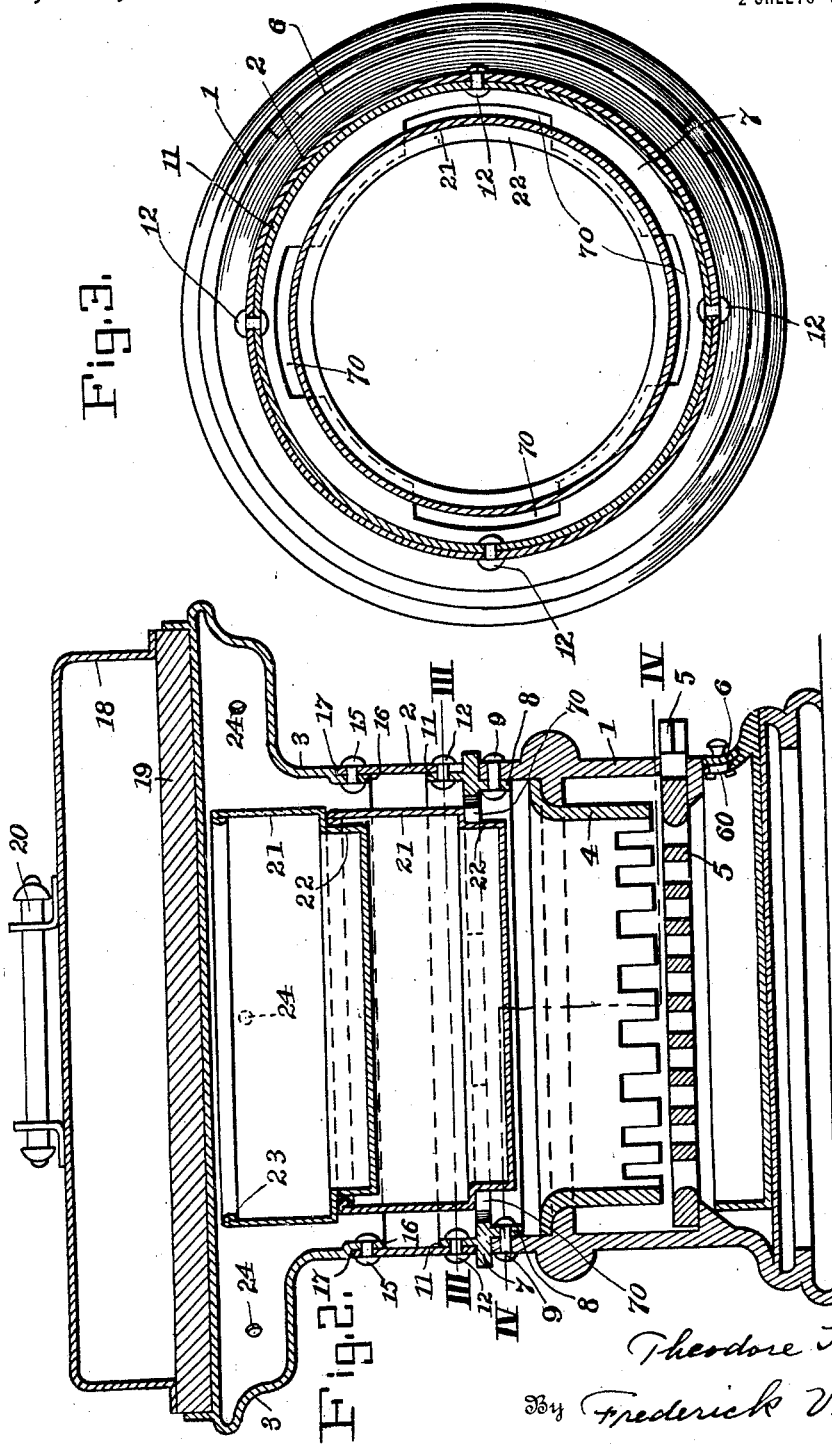

THEODORE KAUFER, OF NEW YORK, N. Y., ASSIGNOR TO KAUFER MANUFACTURING COMPANY, INC., OF NEW YORK, N. Y., A CORPORATION OF NEW YORK.

COOKING-STOVE.

1,383,213.  Specification of Letters Patent.  Patented June 28, 1921.

Application filed June 18, 1919, Serial No. 304,982. Renewed December 4, 1920. Serial No. 428,379.

*To all whom it may concern:*

Be it known that I, THEODORE KAUFER, a citizen of the United States, residing at New York, in the county of Bronx and State of New York, have invented certain new and useful Improvements in Cooking-Stoves, of which the following is a full, clear, and exact specification.

This invention relates to cooking stoves of the type using coal as fuel and has for its object to provide a portable stove of this kind which is of compact construction and in which several articles of food may be cooked at the same time.

Another object is to provide such a stove with means for cooking batter cakes on the top thereof while other foods are being cooked inside. Further objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is an elevation of a stove constructed substantially in accordance with this invention.

Fig. 2 is a central vertical section thereof.

Fig. 3 is a section on the line III—III of Fig. 2, and

Fig. 4 is a section on the line IV—IV of Fig. 2.

The outer shell or casing of the stove is formed of a plurality of detachable interlocking sections, including a bottom or base section 1, one or more intermediate or supplemental sections 2 and a top section 3. The bottom section 1 carries a fire pot 4, a grate 5 and an ash pan 6. Above the fire pot there is detachably connected to the upper edge of the bottom section 1 a ring-shaped plate 7 having a depending flange 8 which fits down in the upper edge of the bottom section and carries pins or rivets 9 to interlock with bayonet slots 10 in said upper edge of the bottom section. The plate or ring 7 also has an upstanding flange 11 carrying pins or rivets 12 to interlock with bayonet slots 13 in the lower edge of the intermediate or supplemental section 2. Other bayonet slots 14 are formed in the upper edge of the section 2 to be engaged by pins or rivets 15 on an inset flange 16 on the lower edge of the top section 3, there being a shoulder 17 around said top section above said inset flange 16 to rest upon the upper edge of the intermediate section 2. It will be understood that any number of intermediate sections may be used although only one is shown in the drawings.

On top of the section 3, which may be of any desired or ornamental form, there is arranged a slab 19 of soapstone or other suitable material on which griddle or batter cakes may be cooked, and when said slab or griddle is not in use it is covered by a drum 18 having a handle 20. The drum or cover 18 may also be used for covering dishes or utensils placed on the griddle 19 to keep them warm, as in a warming oven.

Inside the casing or shell of the stove there are a plurality of superposed cooking vessels 21, each having a reduced lower end portion 22 and an inturned bead 23 at its upper end. The reduced lower end of the lowermost vessel fits in the opening of the ring-shaped plate 7, while the reduced lower end of the upper vessel fits in the upper end of the vessel next below it. While only two vessels are shown in the drawing, it is obvious that this number may be increased to suit requirements and according to the height of the casing which may also be varied as already explained.

The ring-shaped plate 7 has notches 70 in its inner edge to permit the products of combustion to pass up around the bottom vessel to the outlets 24 in the top section 3 of the casing. Said outlets 24 are made comparatively small and are spaced below the griddle so as to retain sufficient heat for cooking cakes on said griddle. In the front of the ash pan 6 there is preferably arranged a slide or damper 60 by means of which air may be admitted below the grate for supporting combustion.

In operation, a fire is kindled in the fire pot before the upper sections 2 and 3 or the cooking vessels are placed thereon, and when said parts are put in place the heat acts first upon the bottom of the lower cooking vessel and through it to the upper vessel. The cooking vessels are also heated by the products of combustion circulating around them within the outer casing.

Having thus described my invention, what

I claim as new and desire to secure by Letters Patent of the United States is:—

1. A portable cooking stove comprising an outer casing, a fire pot therein, a griddle on top of the casing, there being restricted outlets for the products of combustion in the side walls of the casing spaced below the top thereof, said walls being otherwise imperforate, whereby a layer of hot air is retained below the griddle and a removable drum-shaped cover for said griddle.

2. A portable cooking stove comprising an outer casing having a base section, a fire pot therein, a plate detachably mounted on the upper edge of the base section and having an opening with notches at intervals in its edge, an upper section seated upon and detachably connected to said plate, and a cooking vessel removably seated in the opening in the plate over the fire pot leaving passages for the products of combustion through said notches around said vessel.

3. A portable cooking stove comprising an outer casing having a cylindrical base section, a fire pot therein, a ring-shaped plate detachably mounted on the upper edge of the base section and having notches in its inner edge, an upper cylindrical section seated upon and detachably connected to said plate, and a cooking vessel seated in said plate over the fire pot and removable while said sections and plate are in position upon one another, said notches being disposed at intervals around the vessel for the passage of the products of combustion upward around the same.

In testimony whereof I have signed my name to this specification.

THEODORE KAUFER.